US009095876B2

(12) United States Patent
Marti-Arbona et al.

(10) Patent No.: US 9,095,876 B2
(45) Date of Patent: Aug. 4, 2015

(54) IMMOBILIZED CARBON NANOTUBES ON VARIOUS SURFACES

(75) Inventors: Angel A. Marti-Arbona, Houston, TX (US); Avishek Saha, Houston, TX (US); Matteo Pasquali, Houston, TX (US)

(73) Assignee: William Marsh Rice University, Houston, TX (US)

( * ) Notice: Subject to any disclaimer, the term of this patent is extended or adjusted under 35 U.S.C. 154(b) by 291 days.

(21) Appl. No.: 13/521,494

(22) PCT Filed: Jan. 11, 2011

(86) PCT No.: PCT/US2011/020817
§ 371 (c)(1),
(2), (4) Date: Jan. 3, 2013

(87) PCT Pub. No.: WO2011/085363
PCT Pub. Date: Jul. 14, 2011

(65) Prior Publication Data
US 2013/0095314 A1    Apr. 18, 2013

Related U.S. Application Data

(60) Provisional application No. 61/293,853, filed on Jan. 11, 2010.

(51) Int. Cl.
| | | |
|---|---|---|
| C01B 31/02 | (2006.01) | |
| B82Y 30/00 | (2011.01) | |
| B82Y 40/00 | (2011.01) | |
| B05D 3/10 | (2006.01) | |
| C01B 31/00 | (2006.01) | |
| B05D 1/18 | (2006.01) | |
| B05D 5/00 | (2006.01) | |
| B05D 7/24 | (2006.01) | |

(52) U.S. Cl.
CPC *B05D 3/107* (2013.01); *B05D 1/18* (2013.01); *B05D 5/00* (2013.01); *B05D 7/24* (2013.01); *B82Y 30/00* (2013.01); *B82Y 40/00* (2013.01); *C01B 31/00* (2013.01); *C01B 31/0246* (2013.01); *C01B 31/0273* (2013.01); *C01B 2202/02* (2013.01); *C01B 2202/04* (2013.01); *C01B 2202/06* (2013.01); *C01B 2202/30* (2013.01); *C01B 2202/34* (2013.01); *C01B 2202/36* (2013.01); *Y10S 977/742* (2013.01); *Y10S 977/743* (2013.01); *Y10S 977/744* (2013.01); *Y10S 977/745* (2013.01); *Y10S 977/746* (2013.01); *Y10S 977/748* (2013.01); *Y10S 977/749* (2013.01); *Y10S 977/75* (2013.01); *Y10S 977/752* (2013.01); *Y10S 977/842* (2013.01); *Y10S 977/953* (2013.01); *Y10T 428/25* (2015.01)

(58) Field of Classification Search
None
See application file for complete search history.

(56) References Cited

U.S. PATENT DOCUMENTS

| 7,011,760 | B2 | 3/2006 | Wang | |
|---|---|---|---|---|
| 7,074,310 | B2 * | 7/2006 | Smalley et al. | 204/450 |
| 2005/0233465 | A1 | 10/2005 | Miller | |
| 2006/0040381 | A1 | 2/2006 | Zhao | |
| 2006/0274047 | A1 * | 12/2006 | Spath et al. | 345/173 |
| 2007/0280876 | A1 | 12/2007 | Tour | |
| 2008/0063587 | A1 | 3/2008 | Strano | |
| 2008/0213162 | A1 * | 9/2008 | Smalley et al. | 423/447.7 |
| 2012/0183770 | A1 * | 7/2012 | Bosnyak et al. | 428/367 |

OTHER PUBLICATIONS

Usrey, M. et al., "Adsoprption of Single Walled Carbon Nanotubes onto Silicon Dioxide Surface Gradients of 3-Aminopropyltri(ethoxysilane) Described by Polymer Adsorption Theory," Langmuir, 2009, 25 (17), pp. 9922-9930 & abstract.*
Broadwith, P., "Acid solution for nanofibres," Royal Society of Chemistry, Chemistry World [online], Nov. 1, 2009 [retrieved on Mar. 22, 2011]. Retrieved from the Internet:, URL: http://www.rsc.org/chemistryworld/News/2009/November/01110902.asp Nov. 1, 2009>, pp. 1-15.*
Usrey, M. et al. Adsorption of Single Walled Carbon Nanotubes onto Silicon Oxide Surface Gradients of 3-Aminopropyltri(ethoxysilane) Described by Polymer Adsorption Theory. Langmuir, 2009, 25 (17), pp. 9922-9930. Abstract.
Broadwith, P. Acid solution for nanotube fibres. Royal Society of Chemistry, Chemistry World [online], Nov. 1, 2009 [retrieved on Mar. 22, 2011]. Retrieved from the Internet: <URL: http://www.rsc.org/chemistryworld/News/2009/November/01110902.asp Nov. 1, 2009>. pp. 1-15.
International Searching Authority, Notification of Transmittal of the International Search Report and the Written Opinion of the International Searching Authority, or the Declaration. International application No. PCT/US11 20817. Date of mailing: Apr. 8, 2011.

* cited by examiner

*Primary Examiner* — William Phillip Fletcher, III
(74) *Attorney, Agent, or Firm* — Winstead PC

(57) ABSTRACT

In some embodiments, the present invention provides methods of immobilizing carbon nanotubes on a surface, wherein the method comprises: (1) mixing carbon nanotubes with a superacid to form a carbon nanotube solution; and (2) exposing the carbon nanotube solution to the surface. The exposing results in the immobilization of the carbon nanotubes on the surface. In some embodiments, the method occurs without the utilization of carbon nanotube wrapping molecules. Other embodiments of the present invention pertain to systems that comprise immobilized carbon nanotubes on a surface, as developed by the aforementioned methods.

14 Claims, 9 Drawing Sheets

IMMOBILIZED CARBON NANOTUBES ON VARIOUS SURFACES

CROSS REFERENCE TO RELATED APPLICATIONS

This application claims priority to U.S. Provisional Patent Application No. 61/293,853, filed on Jan. 11, 2010, the entirety of which is incorporated herein by reference.

STATEMENT REGARDING FEDERALLY SPONSORED RESEARCH

This invention was not funded by any federally sponsored research grants.

BACKGROUND OF THE INVENTION

The development of new methods and systems for providing immobilized carbon nanotubes (CNTs) on various surfaces is important for the development of large-scale functional materials, including sensors. Current methods and systems of providing such immobilized carbon nanotubes suffer from various limitations. Such limitations include improper dispersion of carbon nanotubes onto surfaces. Such limitations also include inadequate immobilization of carbon nanotubes on various surfaces. Therefore, there is currently a need to develop new methods and systems for providing immobilized carbon nanotubes on various surfaces.

BRIEF SUMMARY OF THE INVENTION

In some embodiments, the present disclosure provides methods of immobilizing carbon nanotubes on a surface. Such methods generally comprise: (1) mixing carbon nanotubes with a superacid (e.g., chlorosulfonic acid) to form a carbon nanotube solution; and (2) exposing the carbon nanotube solution to a surface (e.g., a mesoporous or nanoporous material) to result in the immobilization of the carbon nanotubes on the surface. Desirably, such methods occur without the utilization of carbon nanotube wrapping molecules (e.g., surfactants, soluble silicon oxide molecules, and/or oligonucleotides). In additional embodiments, the methods of the present disclosure may further comprise: (3) washing the immobilized carbon nanotubes with a superacid; and (4) removing the superacid after the washing step.

Further embodiments of the present disclosure pertain to systems that comprise immobilized carbon nanotubes on various surfaces. Such systems are made in accordance with the methods of the present disclosure. Desirably, the immobilized carbon nanotubes in such systems are not associated with any carbon nanotube wrapping molecules.

As set forth in more detail below, the methods and systems of the present disclosure provide numerous improvements in immobilizing carbon nanotubes on various surfaces. In addition, it is envisioned that the methods and systems of the present disclosure can provide various improved applications, including improved nanoscale sensors and improved materials made of carbon nanotubes.

BRIEF DESCRIPTION OF THE FIGURES

In order that the manner in which the above recited and other advantages and objects of the invention are obtained, a more particular description of the invention briefly described above will be rendered by reference to specific embodiments thereof, which are illustrated in the appended Figures. Understanding that these Figures depict only typical embodiments of the invention and are therefore not to be considered limiting of its scope, the invention will be described with additional specificity and detail through the use of the accompanying Figures in which:

FIG. 1A depicts single-walled carbon nanotube (SWCNT) bundles before superacid treatment.

FIG. 1B depicts the isotropic dilution of SWCNTs in superacid.

FIG. 1C depicts an idealized representation of individual SWCNTs dispersed on the surface of Mobile Composition of Matter-41 (MCM-41) (pores have been omitted for clarity).

FIG. 2A shows UV-Vis absorption spectra of SWCNT solutions in chlorosulfonic acid before the addition of MCM-41 (line A) and of the supernatant solution after 24 hours in contact with MCM-41-S(line B) and MCM-41-A (line C).

FIG. 2B shows Raman spectra ($\lambda_{exc.}=784$ nm) of pristine SWCNT powders (line D), SWCNTs dissolved in chlorosulfonic acid (line C), SWCNTs on MCM-41-S(line B), and SWCNTs on MCM-41-A (line A).

FIG. 6A shows scanning electron microscopy (SEM) images (Materials imaged by SEM were treated with ammonia to promote the aggregation of the nanotubes and therefore obtain easier visualization of their dispersion on the surface). FIG. 6B shows transmission electron microscopy (TEM) images (non-aggregated with ammonia).

DETAILED DESCRIPTION OF EXEMPLARY EMBODIMENTS

Figure 1:
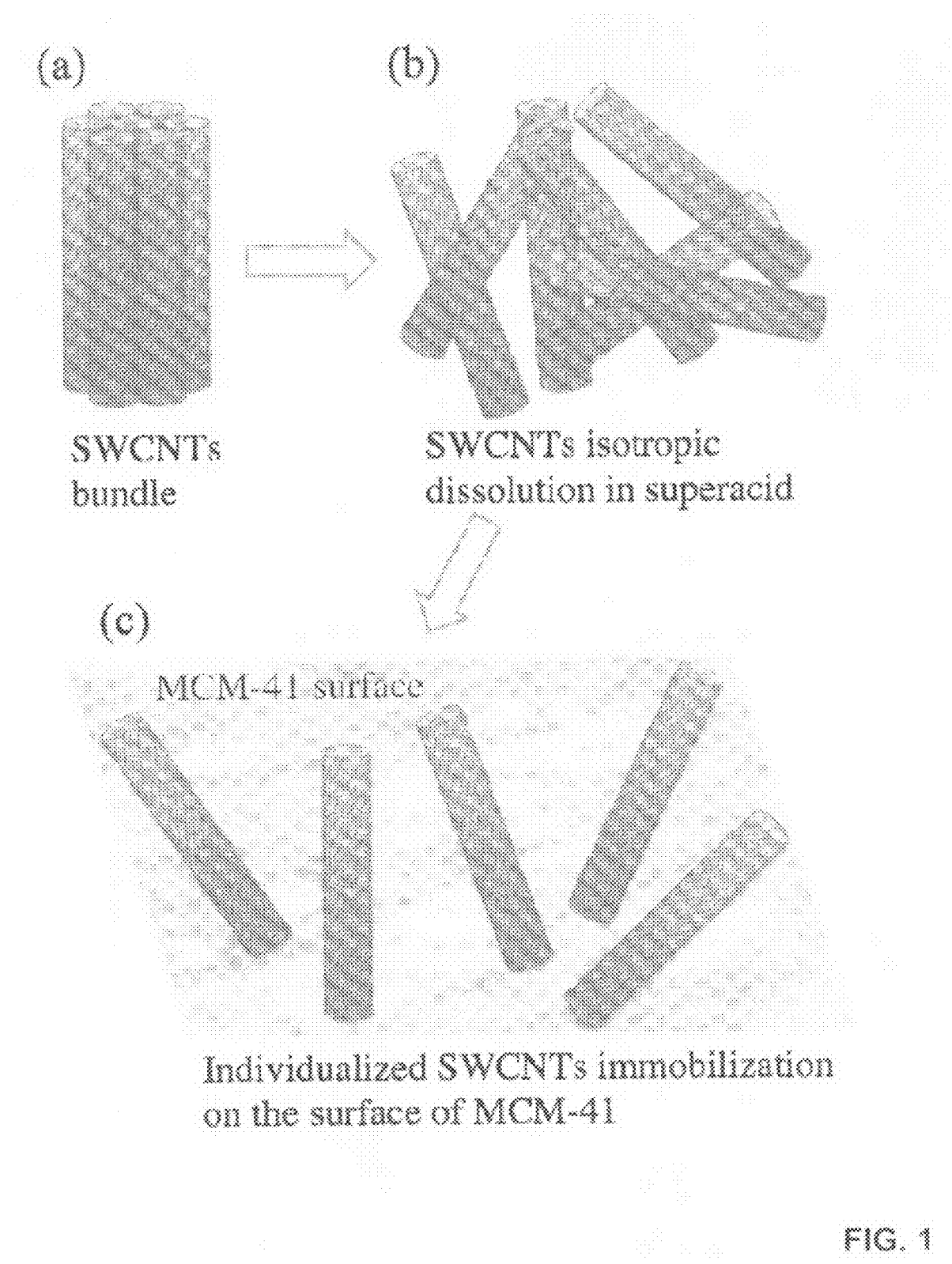
FIG. 1 depicts a schematic representation of a method of immobilizing carbon nanotubes on a surface, in accordance with some embodiments of the present disclosure.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes only and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

The development of new materials where carbon nanotubes are dispersed and individualized is pivotal for the development of large-scale functional materials with novel properties (such as improved sensors, heat sinks, electromagnetic shielding, etc). For instance, individualized SWCNTs display fluorescence that is highly dependent on their environment. Thus, improved nanoscale sensing would require improved individualization and dispersion of CNTs onto various surfaces. However, the assembly of CNTs into large-scale functional materials involves addressing important challenges, including organization, alignment and individualization.

Presently, overcoming the aforementioned challenges is one of the main goals of carbon nanotechnology. Thus, the present invention aims to address these challenges.

Accordingly, one aspect of the present disclosure provides methods of immobilizing carbon nanotubes on a surface. Such methods generally comprise: (1) mixing carbon nanotubes with a superacid to form a carbon nanotube solution; and (2) exposing the carbon nanotube solution to a surface to result in the immobilization of the carbon nanotubes on the surface. In additional embodiments, the method may further comprise: (3) washing the immobilized carbon nanotubes with a superacid; and (4) removing the superacid after the washing. In various embodiments, the methods of the present disclosure desirably occur without the utilization of carbon nanotube wrapping molecules (e.g., surfactants, oligonucleotides, and soluble silicon oxide materials).

Another aspect of the present disclosure pertains to systems made by the aforementioned methods. Such systems generally comprise: (1) a surface; and (2) a plurality of carbon nanotubes immobilized on the surface (preferably in an individualized manner). In various preferred embodiments, the carbon nanotubes of the present systems are not associated with any carbon nanotube wrapping molecules.

A specific example of a method and system of the present invention is depicted in FIG. 1. In this specific embodiment, SWCNTs are mixed with chlorosulfonic acid to form a carbon nanotube solution in which the SWCNTs are isotropically dissolved and dispersed. See FIGS. 1A-1B. The formed carbon nanotube solution is then exposed to MCM-41 by stirring. This results in the immobilization and individualization of the CNTs on the MCM-41 surface to form the system shown in FIG. 1C.

The aforementioned embodiment will be discussed in more detail below. Various aspects of the methods and systems of the present disclosure will also be discussed with more elaboration below as specific and non-limiting examples.

Carbon Nanotubes

The methods and systems of the present disclosure may utilize various types of carbon nanotubes. By way of background, carbon nanotubes are nanoscale carbon structures comprising graphene sheets conceptually rolled up on themselves and closed at their ends by fullerene caps. SWCNTs comprise a single such graphene cylinder, while multi-walled carbon nanotubes (MWCNTs) are made of two or more concentric graphene layers. Since their initial preparation in 1993, SWCNTs have been studied extensively due to their unique mechanical, optical, electronic, and other properties. For example, the remarkable tensile strength of SWCNTs has resulted in their use in reinforced fibers and polymer nanocomposites. See, e.g., Zhu et al., Nano Left. 2003, 3, 1107 (and references cited therein). Also see Baughman et al., Science, 2002, 297, 787-792 for other existing and potential applications of CNTs.

In some embodiments of the present disclosure, carbon nanotubes used in conjunction with the methods and systems of the present disclosure include, without limitation, single-walled carbon nanotubes, double-walled carbon nanotubes, multi-walled carbon nanotubes, small diameter carbon nanotubes (i.e., carbon nanotubes with diameters equal or less than about 3 nm), ultra-short carbon nanotubes (i.e., carbon nanotubes with lengths equal or less than about 100 nm), and combinations thereof. In some embodiments, the carbon nanotubes used in conjunction with the methods and systems of the present disclosure may include pristine carbon nanotubes, such as carbon nanotubes made by the HiPCO method.

In other embodiments, suitable carbon nanotubes for use with various embodiments of the present disclosure may include functionalized carbon nanotubes. Such carbon nanotubes may be functionalized by various functional groups, including but not limited to aryl groups, alkyl groups, halogen groups, aromatic groups, and the like. In more specific embodiments, the carbon nanotubes may include pristine SWCNTs.

Superacids

The methods and systems of the present disclosure may also utilize various types of superacids. Superacids generally refer to acids that have an acidity greater than that of 100% pure sulfuric acid. Non-limiting examples of superacids suitable for use in connection with the methods and systems of the present disclosure include oleum, chlorosulfonic acid, triflic acid, fluorosulfonic acid, trifluoromethanesulfonic acid, perchloric acid, anhydrous hydrogen fluoride, and combinations thereof.

In some embodiments, superacids may also comprise Bronsted acid/Lewis acid complexes. Such complexes can include, without limitation, $HSO_3F/SbF_5$, $HF/SbF_5$, $HCl/AlCl_3$, $HF/BF_3$, and combinations thereof. In more specific embodiments, the superacid used is chlorosulfonic acid. Other suitable superacids may also be envisioned by persons of ordinary skill in the art.

Without being bound by theory, it is envisioned that superacids facilitate the dispersion of CNTs by surrounding the CNTs with a double layer of protons and counterions. See, e.g., Davis et al., Macromolecules, 2004, 37, 154. It is likely that this proposed intercalation of ions is at least partially responsible for the debundling of the CNTs before immobilization onto a surface.

Surfaces

CNTs may be immobilized on various surfaces in accordance with the methods and systems of the present disclosure. In some embodiments, the surfaces comprise mesoporous and/or nonporous materials. Suitable surface materials may include, without limitation, silicates, aluminosilicates, silicon oxides, zeolites, glass, and quartz. In more specific embodiments, the surface may comprise NaY zeolites (e.g., ultrastabilized NaY zeolites), USY zeolites (e.g., ultrastabilized zeolite Y), and the like.

In further embodiments, the surface may comprise a Mobile Composition of Matter surface (MCM), such as MCM-41. Specific examples may include, without limitation, MCM-41-A (ca. 3% Al) and MCM-41-S(<0.5% Al).

The surfaces of the present disclosure may also have various forms, shapes, and structures. For instance, in some embodiments, the surface may be a flat surface. In other embodiments, the surface may have a circular shape. In further embodiments, the surface may comprise glass beads and/or spheres (e.g., silicon oxide spheres). Other suitable surfaces can also be envisioned by persons of ordinary skill in the art.

Methods

As set forth previously, the methods of the present disclosure generally comprise: (1) mixing carbon nanotubes with a superacid to form a carbon nanotube solution; and (2) exposing the carbon nanotube solution to a surface to result in the immobilization of the carbon nanotubes on the surface. The aforementioned steps can occur under various conditions, as well known by persons of ordinary skill in the art. For instance, in some embodiments, the aforementioned mixing and exposure steps may occur at room temperature. In some embodiments, one or more of the aforementioned steps may involve a stirring and/or soaking step. For instance, in a specific embodiment, the exposing of the carbon nanotube solution to the surface comprises stirring the surface and the carbon nanotube solution until a desired amount of the carbon nanotubes in the solution are immobilized onto the surface. In some embodiments, the stirring time may be overnight or for about twenty four (24) hours.

Likewise, in other embodiments, the exposing of the carbon nanotube solution to the surface may comprise soaking the surface with the carbon nanotube solution until a desired amount of the CNTs in the solution are immobilized onto the surface. In some embodiments, such soaking time may be from about 12 hours to about 24 hours. In further embodiments, the exposing step may comprise both a soaking step and a stirring step. Other exposing steps may also be envisioned by persons of ordinary skill in the art.

The carbon nanotubes of the present disclosure may also be immobilized onto surfaces by various means. In some embodiments, the immobilization occurs through the adsorption of the carbon nanotubes onto the surface. Such adsorption may occur through dipole-dipole interactions, London dispersion forces and/or hydrogen bonding. In other embodiments, the immobilization and/or adsorption may entail the formation of covalent bonds and/or ionic bonds between the carbon nanotubes and the surface. Other modes of immobilization can also be envisioned by persons of ordinary skill in the art.

The carbon nanotubes may also become immobilized onto surfaces in various manners. For instance, in preferred embodiments, the carbon nanotubes are immobilized onto a surface in a dispersed manner. See, e.g., FIG. 1C. In additional preferred embodiments, the carbon nanotubes are immobilized onto a surface as individualized carbon nanotubes with little or no bundling or aggregation.

The aforementioned steps may also lead to the modification of carbon nanotubes. For instance, the carbon nanotubes may become protonated once mixed with a superacid during the mixing step. Thereafter, the CNTs may become deprotonated once they are immobilized onto a surface. In other embodiments, the CNTs may remain in protonated state once immobilized.

As set forth previously, the methods of the present disclosure may also comprise additional steps, such as: (3) washing the immobilized carbon nanotubes with a superacid in order to remove unbound or loose CNTs; and (4) removing the superacid after the washing to deprotonate the CNTs and produce more stable materials. In some embodiments, the removal of the superacid may occur by various methods well-known to persons of ordinary skill in the art. Such methods may include, without limitation, vacuum treatment, $N_2$ treatment, and dry $NH_3$ treatment.

Desirably, the aforementioned steps of the present disclosure occur without the utilization of carbon nanotube wrapping molecules. Such carbon nanotube wrapping molecules may include, without limitation, surfactants (e.g., SDS, pluronic and CTAB), oligonucleotides, peptides, metal complexes, organic molecules (e.g., pyrene), polymers, and soluble silicon oxide molecules.

As used herein, "without the utilization of carbon nanotube wrapping molecules" generally refers to the utilization of little or no carbon nanotube wrapping molecules. Accordingly, the above-mentioned definition may still be satisfied in some embodiments if trace or residual amounts of carbon nanotube wrapping molecules are utilized. In further embodiments, the methods of the present disclosure may also occur without the utilization of any sonication steps.

The exclusion of carbon nanotube wrapping molecules and sonication steps from the methods of the present disclosure provide various advantages. For instance, the exclusion of such steps can maintain the electronic properties of the immobilized carbon nanotubes. Furthermore, it is envisioned that the CNTs without wrapping molecules can become substantially or completely exposed. This in turn can make the CNTs potentially more sensitive to their environment. Likewise, Applicants envision that the exclusion of a sonication step can help maintain the structural integrity of CNTs, especially since sonication steps can cut nanotubes and therby decrease their lengths.

CNT Systems

As also set forth previously, the methods of the present disclosure may be utilized to develop various systems that generally comprise: (1) a surface; and (2) a plurality of carbon nanotubes immobilized on the surface. In such embodiments, the immobilized carbon nanotubes desirably comprise individualized carbon nanotubes. More desirably, such carbon nanotubes are uniformly dispersed on the surface in some embodiments. See, e.g., FIG. 1C. In more preferred embodiments, the CNTs comprise SWCNTs. In more specific preferred embodiments, the immobilized CNTs comprise pristine SWCNTs.

In further preferred embodiments, the carbon nanotubes in the systems of the present disclosure are not associated with any carbon nanotube wrapping molecules (as previously described). Such carbon nanotubes are referred to as "naked" CNTs. In contrast, previous research in this area focused on covering CNTs with $SiO_2$ and other wrapping molecules. The approach Applicants describe contrasts with previous work in that Applicants are covering the silicate and other surfaces with "naked" CNTs. Furthermore, in some embodiments, the material produced may be composed of pristine, individualized CNTs.

As used herein, CNTs "not associated with any carbon nanotube wrapping molecules" generally refers to CNTs being associated with little or no carbon nanotube wrapping molecules. Accordingly, the above-mentioned definition may still be satisfied in some embodiments if trace or residual amounts of carbon nanotube wrapping molecules are associated with CNTs.

CNTs immobilized in this way present unique advantages that can be exploited in the construction of new hybrid materials with interesting physical and electronic properties. For example, "naked" individualized CNTs (e.g., naked SWCNTs) on materials with porous surfaces (e.g., MCM-41), may have important applications in the construction of humidity and gas sensors.

The systems of the present disclosure can also have additional applications. For instance, the systems of the present disclosure may be utilized in nanoscale sensing, solar energy conversion, energy storage, energy organization, electrostatic shielding and the construction of heat sinks for electronics.

Additional Embodiments

From the above disclosure, a person of ordinary skill in the art will recognize that the methods and systems of the present disclosure can have numerous additional embodiments. Reference will now be made to more specific embodiments of the present disclosure and experimental results that provide support for such embodiments. However, Applicants note that the disclosure below is for exemplary purposes only and is not intended to limit the scope of the claimed invention in any way.

EXAMPLES

Additional details about the experimental aspects of the above-described studies are discussed in the subsections below.

Example 1

Immobilization and Individualization of SWCNTs on MCM-41

In this Example, Applicants describe the individualization and immobilization of SWCNTs on the surface of MCM-41. MCM-41 is a mesoporous silicate material possessing hexagonal straight channels. The methodology for the immobilization of SWCNTs on MCM-41 involves the use of the reversible protonation of SWCNTs by a superacid (chlorosulfonic acid). Raman spectroscopy shows that the carbon nanotubes are pristine, deprotonated and more importantly, individualized on MCM-41. Furthermore, this was achieved without coating the CNTs with surfactants, therefore yielding "naked" individual SWCNTs on the surface of MCM-41.

By way of background, $SiO_2$ materials present good scaffolds or surfaces for creating hybrid $SiO_2$—SWCNTs composites. Most of the research in this area has been focused into coating CNTs with $SiO_2$. The advantages of this are to keep CNTs from aggregating and to take advantage of the well-known chemistry of $SiO_2$ to introduce surface modifications. The research in connection with this Example has focused on the opposite approach: covering the surface of a $SiO_2$ material with SWCNTs. For this purpose, Applicants used MCM-41, which is composed of a silicon oxide framework with a straight channel structure and defined pore size. The novelty of this approach strikes not only at the efficient coverage of MCM-41 with SWCNTs (in contrast with previous approaches), but also that SWCNTs dispersed on the surface are immobilized and individualized without the assistance of any wrapping molecules (such as surfactants).

The first step in the immobilization and individualization of CNTs in MCM-41 is their individualization in solution. See FIG. 1B. Synthesized SWCNTs form bundled structures that are difficult to individualize and bring into solution due to their large cohesive energy (>0.5 eV/nm). The use of sodium dodecyl sulfate (SDS) in combination with sonication is the preferred method for SWCNT individualization. However, when surfactant-assisted aqueous solutions of SWCNTs were placed into contact with MCM-41, no incorporation of CNTs occurred after 24 hours (data not shown). Accordingly, a less conventional method involving superacids was used to solubilize SWCNTs.

By way of background, isotropic solutions of SWCNTs have been observed in superacids, such as chlorosulfonic acid. Without being bound by theory, Applicants envision that the solubilization is driven by the reversible protonation of the CNT surface. In applying this method, solutions of SWCNTs dissolved in chlorosulfonic acid were placed in contact with MCM-41-A (ca. 3% Al) and MCM-41-S (<0.5% Al). The retention of SWCNTs was followed by UV-Vis spectroscopy of the supernatant after filtration showing 90% and 60% CNT incorporation within MCM-41-A and MCM-41-S, respectively. See FIG. 2A. Subsequent washes with pure chlorosulfonic acid did not extract the CNTs from MCM-41.

The excess of chlorosulfonic acid not extracted by vacuum filtration was removed by a stream of dry nitrogen for 48 hours. Without being bound by theory, Applicants envision that the distinct uptake of SWCNTs by the two MCM-41 materials is likely due to the aluminum content. MCM-41-A, with a higher aluminum content than MCM-41-S, likely has more anionic sites on its surface, thereby facilitating the initial interaction between the material and the positively charged surface protonated SWCNTs.

One possible mechanism for the binding of SWCNTs to MCM-41 is that protonated positively charged SWCNTs are attracted to the negatively charged $AlO_2$ groups on the surface of MCM-41. Also, the binding might involve interaction of the CNTs with the Si—O—Si groups in the surface of the material.

The nitrogen-dried materials were analyzed by Raman spectroscopy. The Raman spectrum of SWCNTs in chlorosulfonic acid ($\lambda_{exc.}$=784 nm) shows only background scattering, which is characteristic of the protonation of SWCNTs. See FIG. 2B. Electromagnetic excitation at 784 nm is in resonance with the $v_1 \rightarrow c_1$ transitions, which are not observed in protonated SWCNTs due to the depletion of the $v_1$ electrons.

When SWCNTs are immobilized on the surface of MCM-41, the common features expected for pristine SWCNTs are recovered (FIG. 2B), which implies that CNTs are deprotonated due to the removal of the chlorosulfonic acid. Commonly, the ratio between the G band (tangential mode band at ca. 1590 $cm^{-1}$) and the D band (disordered mode at ca. 1300 $cm^{-1}$) is used to assess the integrity of the CNT sidewalls. A D/G ratio of less than 1/20 is common for intact HiPco SWCNTs, which is an indication of pristine sidewalls. The D/G ratios of SWCNTs in both MCM-41-A and MCM-41-S are smaller than 1/20 confirming that pristine SWCNTs are immobilized on the surface of MCM-41 (FIG. 2B).

Figure 2:
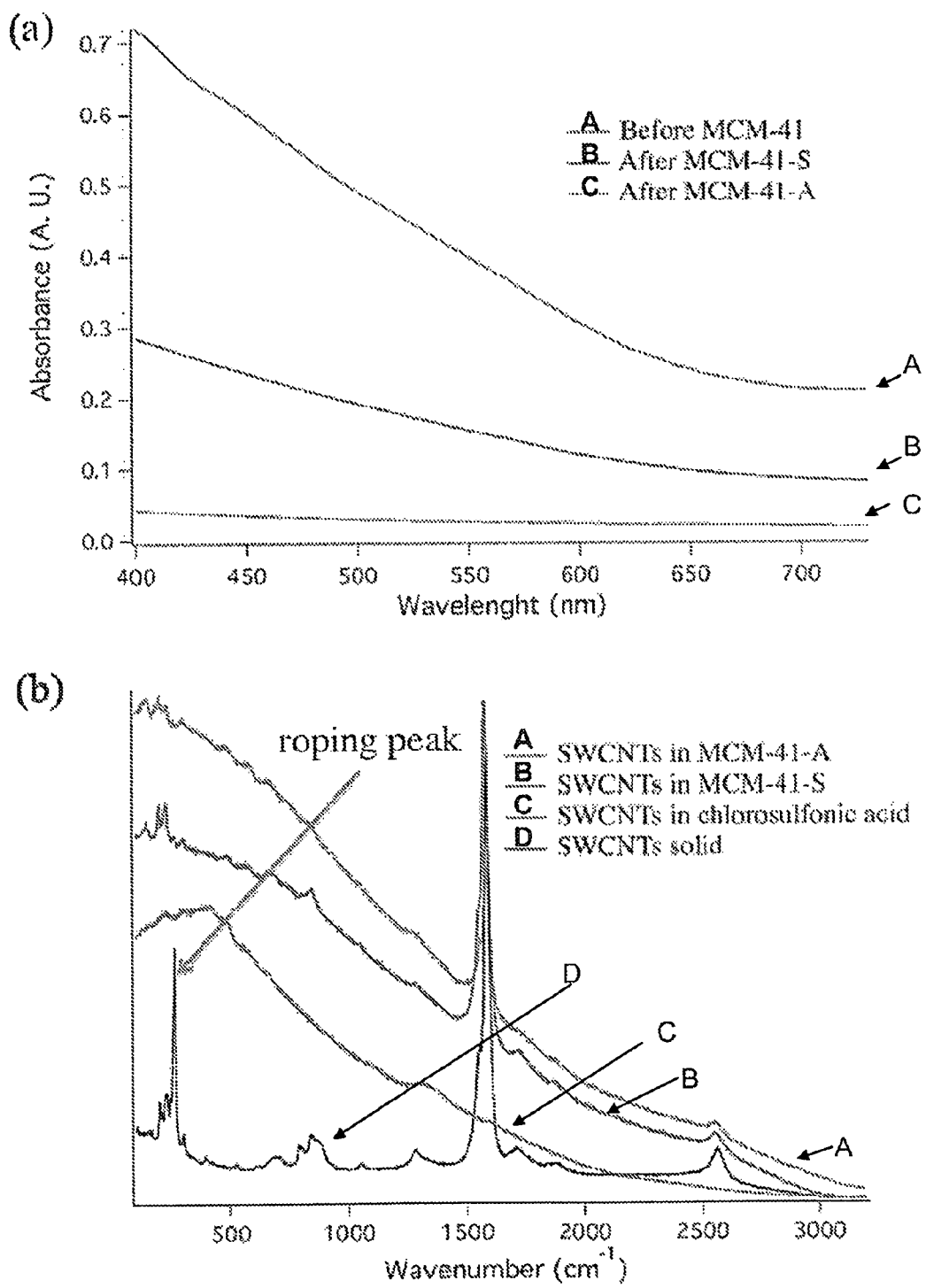
FIG. 2 shows UV-Vis absorption and Raman spectra of various SWCNT solutions.

Another important observation from the Raman spectrum of the SWCNTs on MCM-41 is the absence of the roping peak at 261 $cm^{-1}$ (FIG. 2B). This result indicates that SWCNTs on MCM-41 are no longer forming bundles, which is consistent with their individualization on the surface of these materials.

Figure 3:
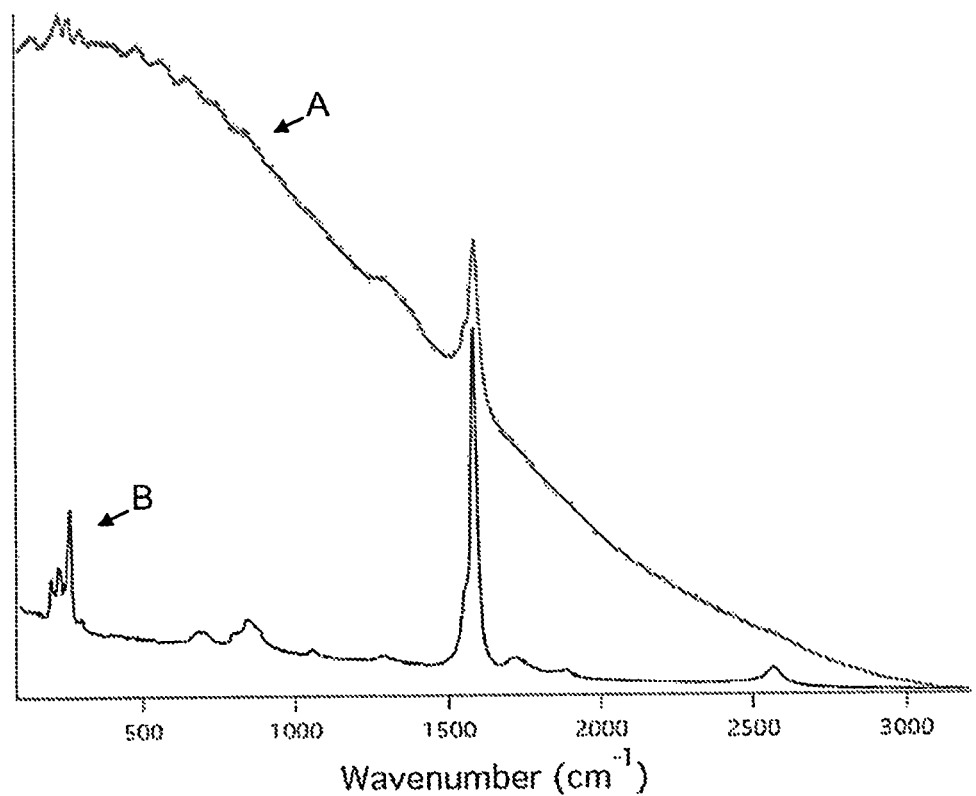
FIG. 3 shows Raman spectra of SWCNT solutions in MCM41-A under various conditions. Line A depicts a Raman spectrum of SWCNTs in MCM-41-A after being exposed to air moisture. Line B depicts Raman spectrum of SWCNTs crashed out of MCM-41-A by addition of ethyl ether.

In contrast, materials exposed to air show a recovery of the 261 $cm^{-1}$ peak, probably by water displacement of the CNTs from the MCM-41 binding sites. See FIG. 3 (Line A). It was also observed that SWCNTs were efficiently displaced from the MCM-41 surface by addition of ethyl ether, giving rise to a Raman spectrum superimposable with that of pristine SWCNTs. See FIG. 3 (Line B). The Raman spectrum of SWCNTs extracted from MCM-41-A this way shows the recovery of the roping peak. Moreover, this Raman spectrum is practically indistinguishable from the Raman spectrum of the SWCNTs powder shown in FIG. 2B (line A, before chlorosulfonic acid and MCM-41).

In conclusion, Applicants report in this Example the immobilization of individual SWCNTs on the surface of MCM-41. SWCNTs on the surface of MCM-41 are not only individualized, but also "naked" (i.e. their individualization is not assisted or substantially assisted by wrapping molecules, such as surfactants or DNA). Previous research in this area focused on covering SWCNTs with $SiO_2$. The approach Applicants describe contrasts with previous work in that Applicants are covering the silicate with SWCNTs. Furthermore, the material produced is composed of pristine, individualized, and "naked" SWCNTs. SWCNTs immobilized in this way present unique advantages that can be exploited in the construction of new hybrid materials with interesting physical and electronic properties. For example, "naked" individualized SWCNTs on materials with porous surfaces (such as MCM-41) may have important applications in the construction of humidity and gas sensors.

Materials and Methods for Example 1

HiPco SWCNTs were purified as described elsewhere. See, e.g., Chiang et al., *J. Phys. Chem. B* 2001, 105, 8297-8301. MCM-41-A was obtained from Aldrich. MCM-41-S was synthesized as described by Ryoo et al., *Chem. Commun.* 1999, 1413-1414.

In a typical experiment, 0.5 mg of SWCNTs and 100 mg of MCM-41 were placed in a vacuum oven at 150° C. for 24 h. Following this, SWCNTs were dissolved in 2 mL of chlorosulfonic acid and stirred overnight. Then, the dry MCM-41 was added to the SWCNTs solution. After 24 h at constant stirring, the mixture was filtered and the supernatant collected and analyzed by UV-Vis spectroscopy (Shimatzu UV-2450). The amount of nanotubes remaining in the supernatant was calculated from the UV-Vis absorption intensity at 500 nm as described by Rai et al., *J. Am. Chem. Soc.* 2006, 128, 591-595. The collected solid was washed three times with pure chlorosulfonic acid and dried under a stream of dry nitrogen for 48 h. The dry samples were kept in a dry inert atmosphere. Samples were analyzed using a Raman microscope (Renishaw in Via MicroRaman Spectrometer).

Example 2

Adsorption Studies of SWCNTs on MCM-41-A

Figure 4:
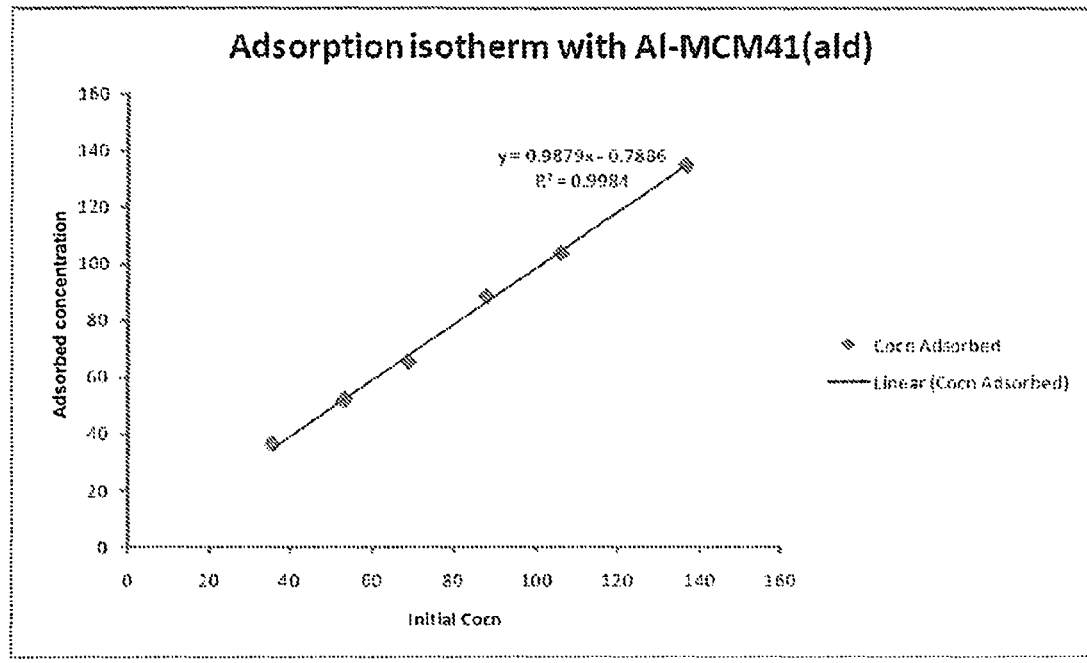
FIG. 4 shows an adsorption isotherm of SWCNTs to MCM-41-A surfaces. The results indicate a direct correlation between the added SWCNT concentrations and the adsorbed concentrations.

To investigate the adsorption isotherm of SWCNTs on MCM-41 surfaces, Applicants prepared SWCNT-chlorosulfonic acid solutions with different concentrations of SWCNTS. Each of these solutions (6 ml) was treated with calcined MCM-41-A materials (0.3 gm) followed by constant stirring for 24 hours. The solutions were then filtered inside the glove box under nitrogen atmosphere. Concentrations of SWCNTS in the filtrate were measured by a UV-Visible spectrometer. The highest concentrations achieved for the above experiment was 4 mg/6 ml of acid. Further increase in the concentration of SWCNTS resulted in the formation of slurry, which was difficult to filter. The results are shown in FIG. 4. These results indicate a direct correlation between the added SWCNT concentrations and the adsorbed concentrations.

Example 3

Adsorption Studies of SWCNTs on MSU Materials

Applicants also used large pore aluminosilicate MSU materials to disperse SWCNTS following the same procedure as described above in Example 1. MSU materials are described in Liu et al., *Journal of the American Chemical Society.* 122 (36) (2000), pp. 8791-8792.

Figure 5:
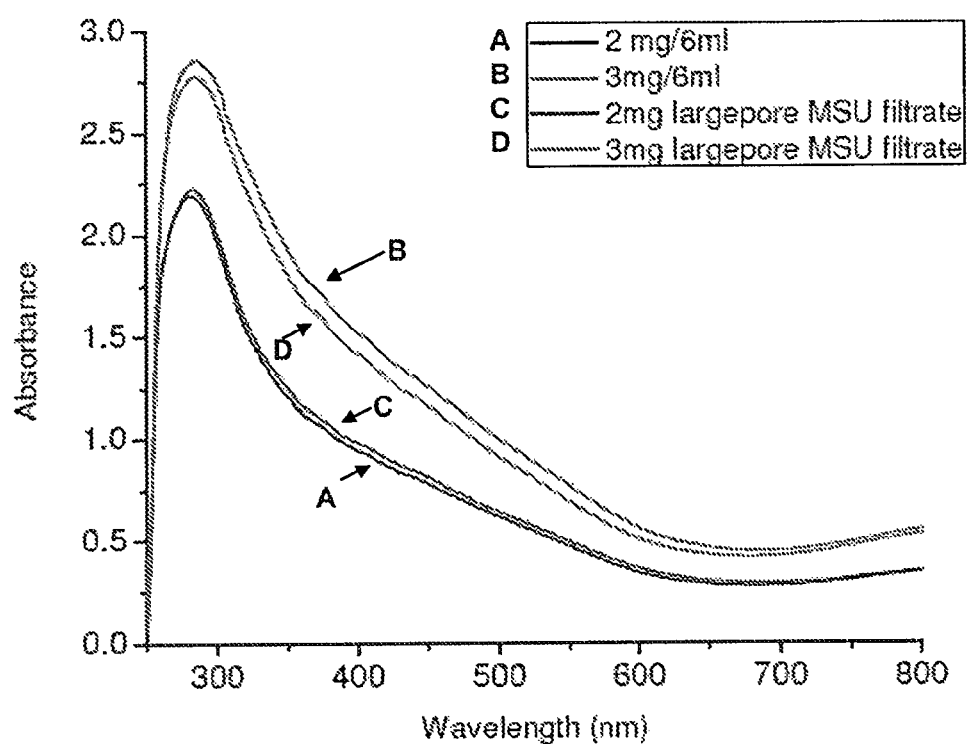
FIG. 5 shows UV-Vis absorption spectra of various SWCNT solutions with or without MSU filtrates.

As shown in FIG. 5, the absorbance of SWCNTs in solution (filtrate) did not change significantly after adsorption. These preliminary studies indicate that MCM-41 materials may be more optimal surfaces for various embodiments of the present invention than MSU materials.

Example 4

Microscopic Studies of Adsorbed SWCNTs

Figure 6:
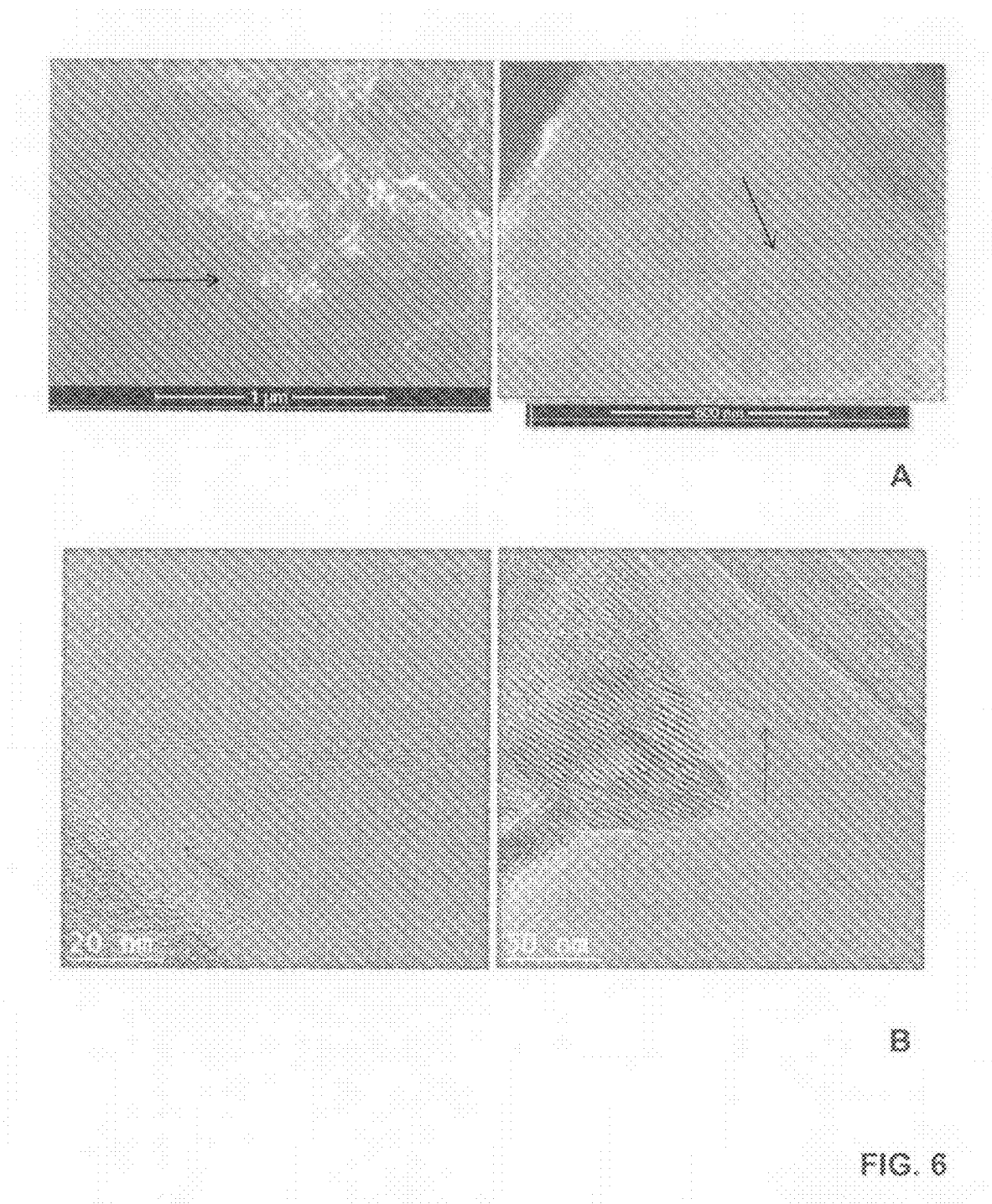
FIG. 6 shows electron microscopy images of SWCNTs covering the surface of MCM-41-A materials.

Scanning electron microscopy images showing SWCNTs covering the surface of the MCM-41-A from Example 2 are shown in FIG. 6A. Initial concentration of SWCNT in solution was 0.16 mg/ml. The residue was dried in vacuum followed by a stream of dry $NH_3$. As can be seen in the images, mostly debundled SWCNTs are occupying the surface of MCM-41-A.

Transmission electron microscopy images of SWCNTs dispersed on the surface of Al-MCM-41 materials are shown in FIG. 6B. In this image, the concentration of the initial SWCNT solution was 0.66 mg/ml.

Example 5

Surface Area Studies of MCM Materials

Figure 7:
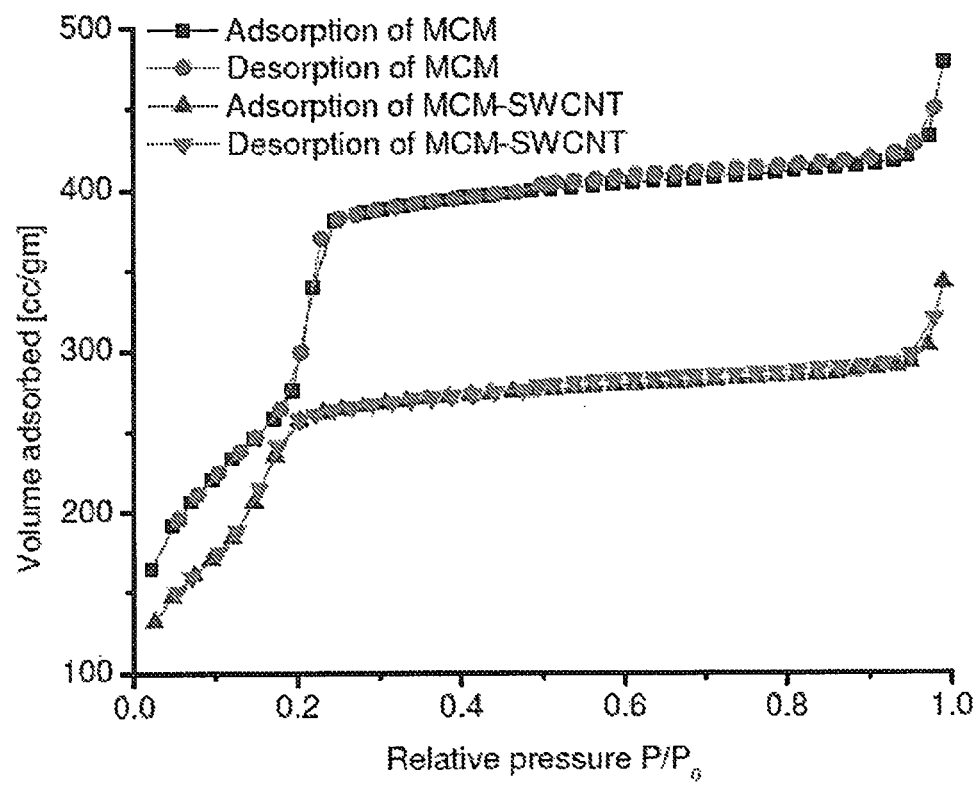
FIG. 7 shows adsorption isotherms of MCM-41-A and MCM-41-A-SWCNTs at liquid nitrogen temperature. The surface area of MCM-41-A and MCM-41-A-SWCNT samples were 1332 $m^2$/gm and 868 $m^2$/gm, respectively. This reduction in surface area indicates SWCNT surface adsorption due to pore obstruction.

To measure the change in surface area of MCM-41 materials after SWCNT adsorption, adsorption isotherms of MCM-41-A and MCM-41-A-SWCNTs were done at liquid nitrogen temperature. The surface area of MCM-41-A and MCM-41-A-SWCNT samples were 1332 $m^2$/gm and 868 $m^2$/gm respectively. See FIG. 7. The reduction in surface area provides additional evidence that SWNCTs disperse on the MCM-41 surface due to the obstruction of the MCM-41 pores by the CNTs immobilized in the surface.

Example 6

Adsorption of SWCNTs onto Zeolite Surfaces

Figure 8:
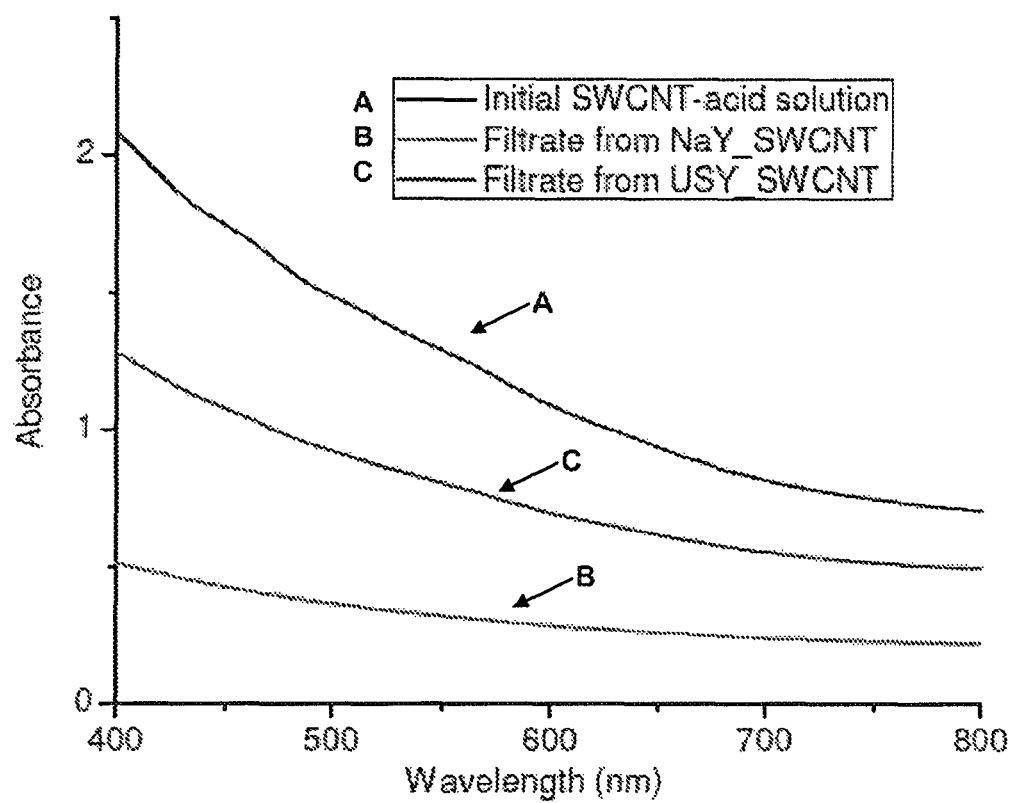
FIG. 8 shows UV-Vis absorption spectra of various SWCNT solutions that were added to the surface of zeolites. The zeolites used were ultrastabilized zeolite Y (USY) and sodium exchanged sample of zeolite Y (or NaY).

The absorption of SWCNT from SWCNT-chlorosulfonic acid solutions exposed to the surfaces of zeolites was also investigated. Two zeolite samples were used in place of MCM materials: ultrastabilized zeolite Y (USY) and sodium exchanged sample of zeolite Y (or NaY). The $SiO_2/Al_2O_3$ ratio of USY and NaY are 83 and 5.1, respectively. As shown in FIG. 8, filtrate from the NaY-SWCNT solution had a lower concentration of SWCNT than the filtrate from the USY-SWCNT solution. Thus, NaY zeolite may have a higher affinity for SWCNT than USY zeolites. Without being bound by theory, such observations can be related to the higher aluminum content of NaY. Nonetheless, the results indicate that NaY and USY zeolites make suitable surfaces for use in the systems and methods of the present invention.

Figure 9:
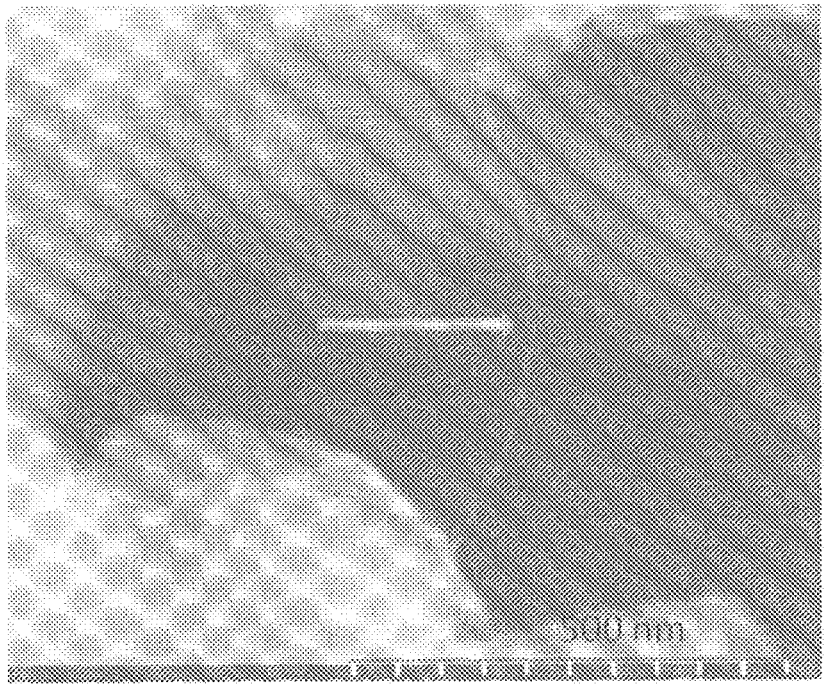
FIG. 9 shows SEM images of NaY-SWCNT residue materials. The images show debundled SWCNTs are dispersed on the external surface of NaY zeolites.
Figure 9:
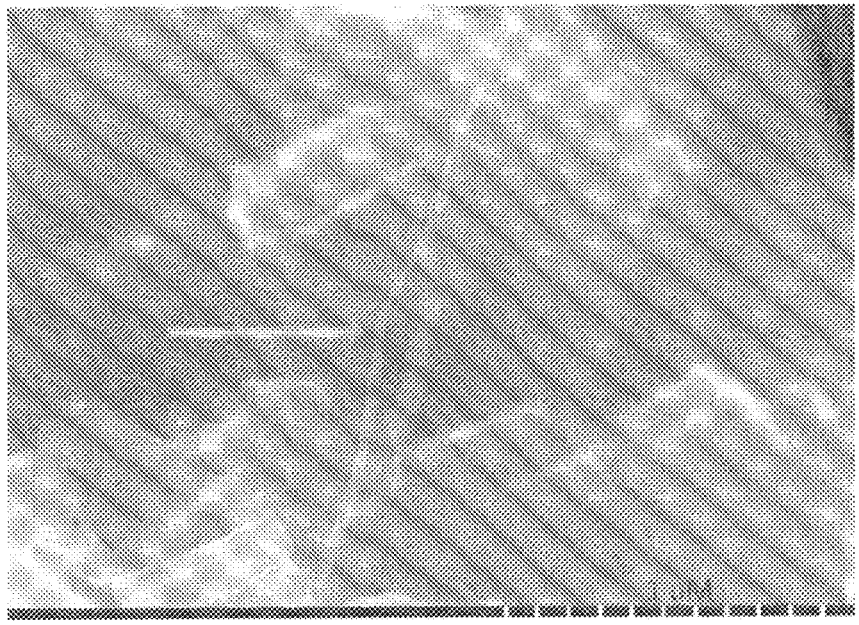

The aforementioned observations were confirmed by SEM images. In particular, FIG. 9 shows SEM images of the above-mentioned NaY-SWCNT materials. The images show debundled SWCNTs being dispersed on the external surface of NaY zeolites.

Without further elaboration, it is believed that one skilled in the art can, using the description herein, utilize the present invention to its fullest extent. The embodiments described herein are to be construed as illustrative and not as constraining the remainder of the disclosure in any way whatsoever.

While the preferred embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of immobilizing carbon nanotubes on a surface, wherein the method comprises:
   a. mixing carbon nanotubes with a superacid to form a carbon nanotube solution; and
   b. exposing the carbon nanotube solution to the surface, wherein the exposing results in the immobilization of the carbon nanotubes on the surface, and wherein the method occurs without the utilization of carbon nanotube wrapping molecules.

2. The method of claim 1, wherein the carbon nanotubes comprise pristine carbon nanotubes.

3. The method of claim 1, wherein the carbon nanotubes are selected from the group consisting of single-walled carbon nanotubes, double-walled carbon nanotubes, multiwalled carbon nanotubes, small diameter carbon nanotubes, ultra-short carbon nanotubes, and combinations thereof.

4. The method of claim 1, wherein the superacid is selected from the group consisting of oleum, chlorosulfonic acid, trifluoromethanesulfonic acid, triflic acid, fluorosulfonic acid, perchloric acid, anhydrous hydrogen fluoride, Bronsted acid/Lewis acid complexes, and combinations thereof.

5. The method of claim 1, wherein the superacid is chlorosulfonic acid.

6. The method of claim 1, wherein the carbon nanotube solution comprises protonated carbon nanotubes.

7. The method of claim 1, wherein the exposing of the carbon nanotube solution to the surface comprises stirring or soaking the surface and the carbon nanotube solution.

8. The method of claim 1, wherein the immobilizing comprises adsorption of the carbon nanotubes to the surface.

9. The method of claim 1, wherein the immobilized carbon nanotubes comprise deprotonated carbon nanotubes.

10. The method of claim 1, wherein the immobilized carbon nanotubes comprise individualized carbon nanotubes.

11. The method of claim 1, wherein the surface comprises one or more materials selected from the group consisting of aluminosilicates, silicates, silicon oxides, zeolites, glass, and quartz.

12. The method of claim 1, further comprising:
   washing the immobilized carbon nanotubes with a superacid; and
   removing the superacid after the washing.

13. The method of claim 1, wherein the carbon nanotube wrapping molecules are selected from the group consisting of surfactants, oligonucleotides, peptides, organic molecules, metal complexes, polymers, and soluble silicon oxide materials.

14. The method of claim 1, wherein the method occurs without the use of sonication.

* * * * *